Figure 1:
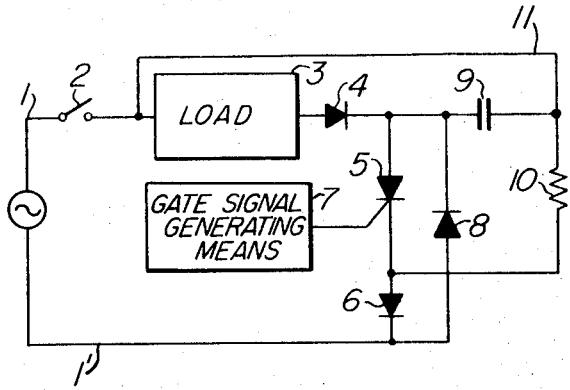

United States Patent
Hosokawa et al.

[15] 3,636,310
[45] Jan. 18, 1972

[54] HEAT-RESPONSIVE TEMPERATURE CONTROL DEVICE

[72] Inventors: Tomoyuki Hosokawa, Takarazuka; Toshii Tsugeki, Takatsuki; Shigeru Kusunoki, Hirakata, all of Japan

[73] Assignee: Matsushita Electric Industrial Co. Ltd., Osaka, Japan

[22] Filed: Apr. 17, 1970

[21] Appl. No.: 29,460

[30] Foreign Application Priority Data

Apr. 22, 1969 Japan..................................44/32423

[52] U.S. Cl..............................................210/501, 219/494
[51] Int. Cl...........................................................H05b 1/02
[58] Field of Search..........................219/494, 501, 504, 505

[56] References Cited

UNITED STATES PATENTS

| | | | |
|---|---|---|---|
| 3,493,727 | 2/1970 | Hosokawa et al. | 219/505 |
| 3,381,226 | 4/1968 | Jones et al. | 219/501 |
| 3,426,969 | 2/1969 | Anderson | 219/501 |

*Primary Examiner*—George Harris
*Assistant Examiner*—F. E. Bell
*Attorney*—Stevens, Davis, Miller & Mosher

[57] ABSTRACT

An improved heat-responsive temperature control device used for electric blankets, electric carpets and the like in which the reliability thereof is improved and the radio interference thereby is obviated by performing nonmechanical contacting temperature control and zero-voltage switching of the heater.

6 Claims, 10 Drawing Figures

HEAT-RESPONSIVE TEMPERATURE CONTROL DEVICE

The present invention relates to a heat-responsive temperature control device used for electric blankets, electric carpets and the like, and more specifically to an improved heat-responsive temperature control device wherein the reliability thereof is raised and the radio interference thereby is obviated by performing nonmechanical contacting temperature control and zero-voltage switching of the heater.

Generally, when controlling power to a load by phase control utilizing a thyristor, radio noise is generated from the thyristor, load or the like and radio interference is caused thereby.

In the conventional temperature control device, therefore, the radio noise wave causing the above-described radio interference has been absorbed with a filter including a capacitor and a choke coil. Since there is distribution in the characteristics of the choke coil, the absorption effect of the above-described filter has not always been sufficient.

And, when a number of heaters are arranged over a large area as in electric blanket, it is difficult in practice to shield the whole blanket so as to obviate the radio interference.

The present invention overcomes the above-described disadvantages of the conventional temperature control device, and the principal object thereof is to provide a heat-responsive temperature control device wherein the radio interference thereby is obviated by performing nonmechanical contacting temperature control utilizing a thyristor and zero-voltage switching of the heater, and the gate signal not be transmitted to the thyristor due to inoperative components in the gate circuit, the thyristor is put into an inoperative state to keep the device in a safe condition.

Another object of the present invention is to provide a heat-responsive temperature control device wherein the rise time, i.e., the time for reaching predetermined temperature, is shortened by zero-voltage switching of the heater. This second object of the present invention will be better understood by the following brief description. In conventional phase-control means utilizing a thyristor, the above-described time for reaching the prescribed temperature is delayed, since the phase of the gate signal in the positive half cycle of the power voltage is shifted and the conduction angle of the thyristor is reduced as the temperature of the electric blanket increases and, accordingly, the voltage impressed on the heater is reduced. In contrast in the heat-responsive temperature control device in accordance with the present invention, even if the phase of the gate signal in the gate circuit is shifted the signal is transmitted into the thyristor in the negative half cycle of the power supply voltage to maintain the conduction in the thyristor until the negative half cycle is shifted into the positive half cycle thereof, whereby the variations in voltage of the positive part of the cycle of the power supply impressed on the heater are eliminated.

A further object of the present invention is to provide a heat-responsive temperature control device wherein the rising temperature characteristic is not varied regardless of the predetermined temperature. If the predetermined temperature is lowered from its higher to lower prescribed temperature in the conventional control device utilizing phase control, an additional operation is required to correct the adjustment of the variable resistor to obtain the proper temperature since the resistance of the variable resistor should be lowered to its minimum magnitude to obtain a better temperature rise characteristic when changing the predetermined temperature in order to compensate for the small conduction angle of the thyristor. In contrast, in the control device in accordance with the present invention, the additional operation in the conventional control device as described above is eliminated by performing zero-voltage switching of the heater. Thus, the heat-responsive temperature control device in accordance with the present invention can be easily set and operated at a desired temperature.

A still further object of the present invention is to provide a heat-responsive temperature control device having a fail-safe circuit.

Other objects and advantages of the present invention will be made apparent from the following description of the preferred embodiments of the invention taken in conjunction with the accompanying drawings in which:

FIG. 1 is an electric circuit diagram of an embodiment of the heat-responsive temperature control device in accordance with the present invention.

Figure 2:
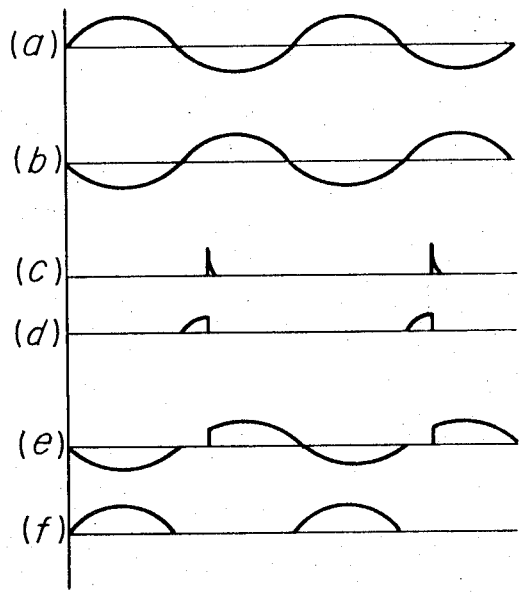
Figure 3:
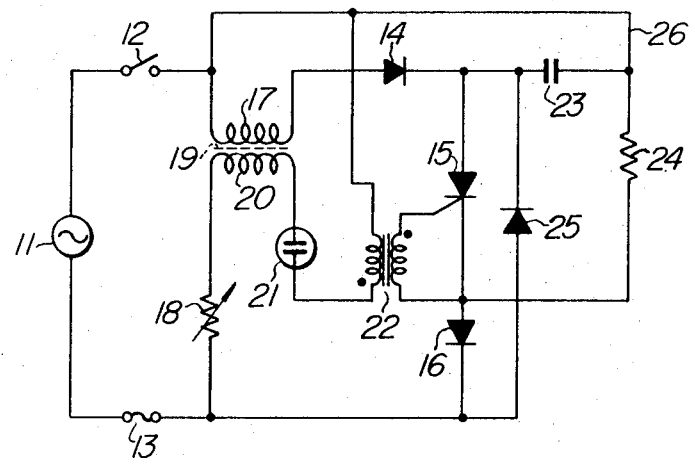
Figure 4:
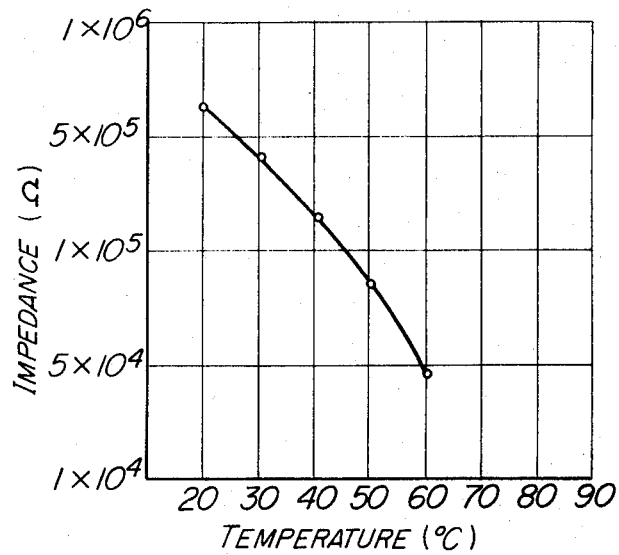
Figure 8:
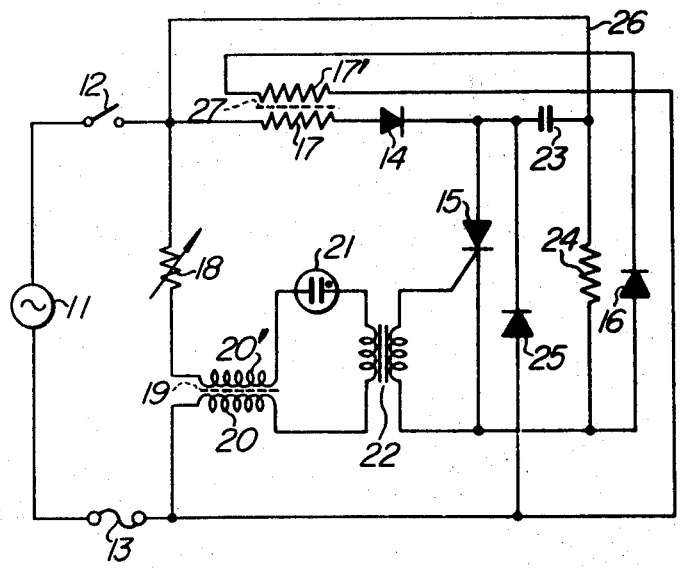
Figure 9:
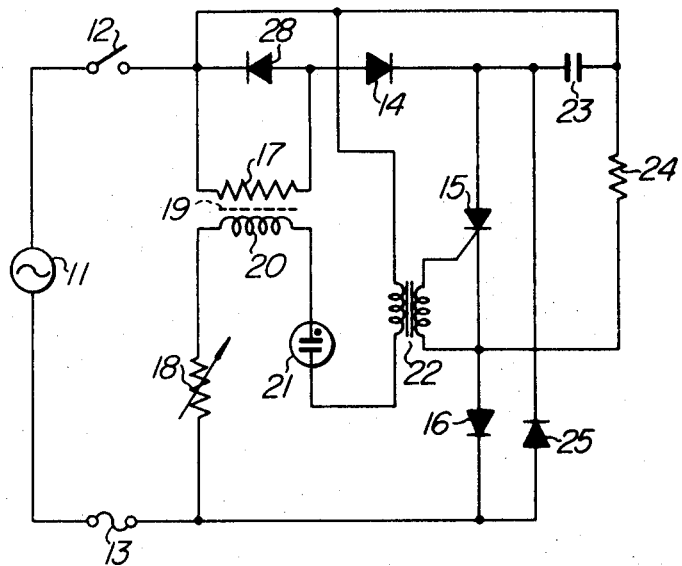
Figure 10:
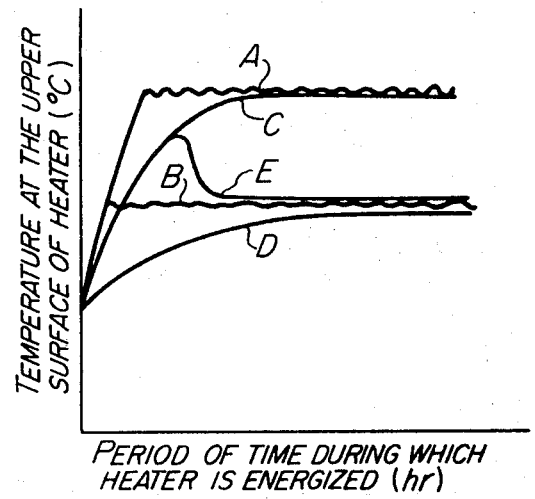

FIGS. 2(a) to (f) are diagrams showing the waveforms of the voltage between various points in the electric circuit shown in FIG. 1, FIG. 3 is an electric circuit diagram of another embodiment of the heat-responsive temperature control device in accordance with the present invention, FIG. 4 is a diagram showing the impedance-temperature characteristic curve of the thermistor employed in the circuit of the second embodiment of the invention shown in FIG. 3, FIGS. 5(a) to (f) are diagrams showing the wave forms of the voltage between various points in the electric circuit of the second embodiment of the invention shown in FIG. 3, FIGS. 6 through 9 are electric circuit diagrams of further embodiments of the heat-responsive temperature control device in accordance with the present invention, and FIG. 10 is a diagram showing various rising temperature characteristic curves of various embodiments of the heat-responsive temperature control device in accordance with the present invention and of the conventionally known type of control device.

Referring now to FIG. 1, a switch 2, a load 3, a diode 4, a thyristor 5 and a diode 6 are connected in series across a source of alternating current 1 and 1'. A capacitor 9 and a resistor 10 are connected in series with each other and coupled in parallel with the thyristor 5. A diode 8 is connected in parallel with the thyristor 5 and diode 6 connected in series. The node connecting the capacitor 9 with the resistor 10 is a point between the switch 2 and the load 3 with a lead wire 11. The gate signal generating means for the thyristor 5 is shown by the numeral 7. The waveforms of the voltages between various points in the electric circuit shown in FIG. 1 when the switch 2 is closed and an electric current flows through the thyristor 5 are shown in FIGS. 2(a) to (f).

In FIG. 2, the curve (a) shows the waveform of the power supply voltage, and the curve (b) shows the waveform of the terminal voltage of the capacitor 9 when an electric current flows through the thyristor 5. Accordingly, if the pulse signal as shown in FIG. 2(c) is inserted into the gate of the thyristor 5 from the gate signal generating means 7 during the negative part of the cycle of the power supply voltage, the charge in the capacitor 9 is discharged through the thyristor 5 and the resistor 10. Thus, the electric current flows through the thyristor 5. The time constant of the capacitor 9 and the resistor 10 is so selected that a holding current may flow through the thyristor 5 until the cycle of the power supply voltage becomes positive and a latching current starts to flow through the thyristor 5.

The curve shown in FIG. 2(d) represents the terminal voltage between the anode and cathode of the thyristor 5, the curve shown in FIG. 2(e) represents the terminal voltage of the resistor 10, and the curve shown in FIG. 2(f) represents the terminal voltage of the load 3 such as a heater.

As is apparent from the curve shown in fig. 2(f), the power supply voltage is not applied across the load during negative half cycles because of the action of diode 4. Rather, the supply voltage is applied across the load in the form of half sinusoidal waves only during positive half cycles thereof. Accordingly, there are no switching transients present to cause radio interference. The magnitude of the current shown in FIG. 2(e) is the order of milliamperes, which will not cause radio interference in general. In the positive half cycle wherein the electric current flows through thyristor 5 and load 3 is impressed with the power supply voltage, the current flows through the lead wire 11, the resistor 10 and the diode 6, and the capacitor 9 is charged through the lead wire 11, thyristor 5 and diode 6. Accordingly, when the power supply voltage is shifted from the positive to negative half cycle the thyristor 5 is put into a blocking condition. If a pulse signal is not inserted into the gate the negative half cycle, therefore, the thyristor 5 maintains its blocking condition and load 3 is not impressed with the power supply voltage.

In the electric circuit shown in FIG. 1, the diode 4 is provided for preventing the load current from flowing through the diode 8, and the diode 6 is to prevent the current from passing through the resistor 10 in the negative half cycle of the power supply voltage. That is, if the diode 6 is not connected in the circuit, the charge of the capacitor 9 cannot be discharged through the thyristor 5 and the resistor 10 even when the pulse signal is applied to the gate of the thyristor 5 since the capacitor 9 and the resistor 10 are impressed with the power supply voltage of the same phase and same potential in the negative half cycle of the power supply voltage. In such a case, therefore, the current would not flow through the thyristor 5 in spite of the gate signal.

In the above-described embodiment of the present invention, the period of the load voltage can be varied and the load can be controlled at will by a gate signal generating means capable of setting a desired room temperature.

Figure 5:
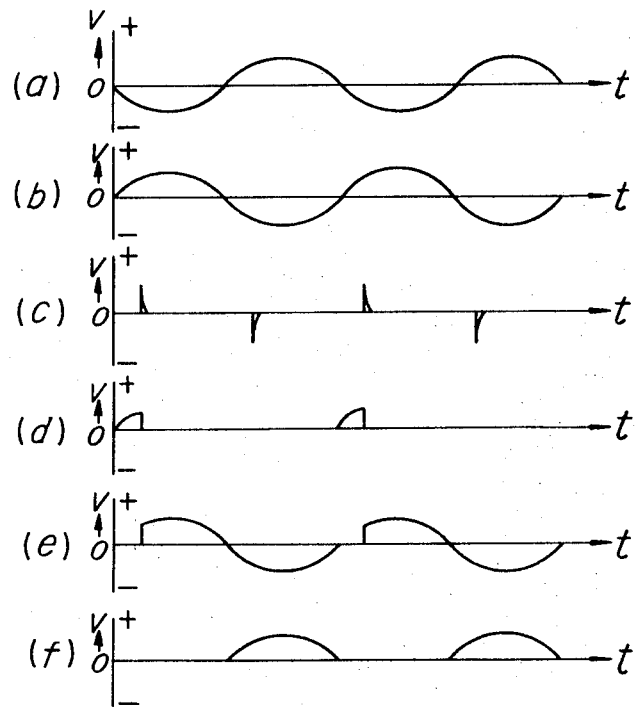

Referring now to FIGS. 3, 4 and 5, another embodiment of the present invention will be described in detail, wherein the load in the first embodiment is substituted by a thermistor interposed between a couple of conductors. One of the conductors serves as a heater and the other serves as a detecting wire.

In FIG. 3, the reference numeral 11 indicates a source of alternating current, and the numerals 12 and 13 indicate a switch and a fuse, respectively, for coupling a main circuit and a control circuit therefor which are connected in parallel with each other in series with the source of alternating current 11. The main circuit is composed of a diode 14, thyristor 15, diode 16 and a conductor 17 serving as a heater which are all connected in series. The control circuit is composed of a variable resistor 18, a conductor 20, a pulse signal generating element 21 such as a neon glow lamp, a primary winding of a pulse transformer 22, the above four members being connected in series across the fuse 13 and a common terminal of the switch 12 and the conductor 17, a secondary winding of the pulse transformer 22 which is connected between the gate and the cathode of the thyristor 15, a capacitor 23 and a resistor 24 connected in series between the anode and the cathode of the thyristor 15 in parallel therewith, a diode 25 connected across a common terminal of the diode 14 and the thyristor 15 and a common terminal of the fuse 13 and the variable resistor 18 in reversed relationship with the diode 14, and a wire 26 connecting the common terminal of the switch 12 and the conductor 17 with the common terminal of the capacitor 23 and the resistor 24 so that the capacitor 23 may be charged through the diode 25.

The polarity of the primary and secondary windings of the pulse transformer 22 is so set that the power supply voltage when the electric current flows through the conductor 17 may be positive and the electric current through the pulse signal generating element 21 serves as a gate signal of the thyristor 15 when the power supply voltage is in its negative half cycle.

The time constant of the capacitor 23 and the resistor 24 is so set that the electric current continues to flow through the thyristor 15 until the diodes 14 and 16 and the thyristor 15 are impressed with the positive half cycle of the source of alternating current 11.

The purpose of providing the diode 14 is to prevent the current from flowing through the load 17 during negative half cycles of the power supply voltage, and the purpose of providing the diode 16 is to prevent the aforesaid current from flowing through the resistor 24 curing the negative half cycle of the power voltage.

In other words, without diode 16, a voltage of the same phase and same potential is impressed on the capacitor 23 and the resistor 24 in the negative half cycle of the source of alternating current 11, which the charge in capacitor 23 from being discharged through the thyristor 15 and the resistor 24 even when the signal is applied the gate of the thyristor 15. Accordingly, the above-described conditions that the thyristor 15 be in a conductive state until the positive half cycle of the power supply voltage is impressed cannot be fulfilled without the diode 16.

In the above-described second embodiment, when the switch 12 is closed and the AC voltage as shown in FIG. 5(a) is supplied to the circuit, the source voltage is impressed on the variable resistor 18 and the thermistor 19 disposed between a couple of conductors 17 and 20. And, since the thermistor 19 has characteristic of impedance-to-temperature as shown in FIG. 4, in the case that the temperature of the blanket is still low, a comparatively high source voltage is impressed on the thermistor 19. When the above-mentioned voltage is as high as the firing potential of the pulse-generating element 21, the element 21 is discharged and the pulse current generated by the voltage drop from the firing potential to the discharge-maintaining voltage flows through the pulse transformer 22.

On the other hand at this time, the capacitor 23 is already charged through the diode 25 and, accordingly, the charge in the capacitor 23 is discharged through the thyristor 15 and the resistor 24 when the thyristor 15 is put in a conductive state by the signal as shown in FIG. 5(c). Therefore, the electric current keeps on flowing through the thyristor 15. The curve shown in FIG. 5(b) represents the voltage between the terminals of the capacitor 23, the curve shown in FIG. 5(d) represents the voltage between the anode and the cathode of the thyristor 15, and the curve shown in FIG. 5(e) represents the voltage between the terminals of the resistor 24.

Since the thyristor 15 is maintained in a conductive state until the diodes 14, 16 are impressed with the voltage of forward direction by the source of alternating current 11, that is, until the source voltage as shown in FIG. 5(a) is shifted to the positive half cycle from the negative cycle according to the prescribed time constant of the capacitor 23 and the resistor 24, the zero-volt switching as shown by the voltage curve at the conductor 17 in FIG. 5(f) is performed when the source voltage is switched into the positive half cycle. Thus, the load current flows through the thyristor 15 and the conductor 17 is heated. The rising voltage of the resistor 24 at this time as shown in FIG. 5(e) will not cause radio interference in general, since the magnitude of the resistance of the resistor 24 is as large as several kilohms, while and accordingly that of the electric current flowing therethrough is as small as several milliamperes.

In the positive half cycle of the source voltage 11, the thyristor 15 is to be put into a blocking state when the source voltage is shifted from positive to negative since the direction of the current flowing through the resistor 24 is reversed. However, since a signal is already put into the gate of the thyristor during the negative half cycle of the source voltage, the thyristor is never put in a durable blocking state. If the pulse signal is not put into the gate of the thyristor, the thyristor continues the blocking state and no electric current flows through the conductor 17, a heater.

Thus, the temperature of the heated conductor 17 is controlled to the predetermined temperature set by the variable resistor 18 by means of the thermistor 19.

Figure 6:
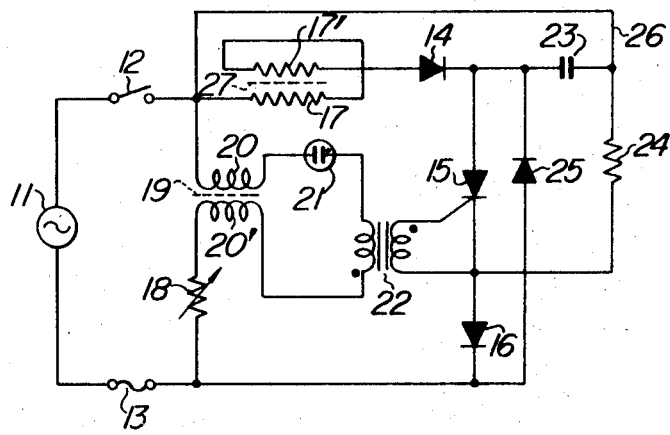

Now another embodiment of the temperature control device in accordance with the present invention wherein the load 3 in the first embodiment shown in FIG. 1 is substituted by an insulating layer interposed between a couple of heaters which is molten at a temperature above a prescribed temperature and the gate signal generating means 7 is substituted for by a thermistor interposed between a couple of signal wires as will be described with reference to FIG. 6. In FIG. 6, the like members in FIG. 3 are indicated by the like numerals.

In the circuit shown in FIG. 6, a switch 12, a couple of heaters 17 and 17' connected in series and interposing an insulating layer 27 which is molten at above a prescribed temperature, a diode 14, a thyristor 15, a diode 16 and a current fuse 13 are connected in series with a source of alternating current, one of the couple of signal wires 20 interposing a thermistor 19 (referred to as "plastic thermistor" hereinafter), a pulse-generating element 21 (referred to as "- neon lamp" hereinafter), a primary winding of the pulse transformer 22, the other couple of the signal wires 20', and a variable resistor 18 are connected in series across a common terminal of the switch 12 and the heater 17 and a common terminal of the fuse 13 and the diode 16, and a secondary winding of the transformer 22 is connected across the gate and the cathode of the thyristor 15. And, a capacitor 23 and a resistor 24 connected in series are coupled to the anode and the cathode of the thyristor 15 in parallel therewith, and a diode 25 is connected in series with the capacitor 23 so that the combination of the capacitor 23 and the diode 25 is coupled between the common terminal of the switch 12 and the heater 17 and the common terminal of the fuse 13 and the diode 16. The electric circuit as described above is used for controlling the temperature of the heater therein incorporated in an electric blanket. When the switch 12 is closed in the embodiment shown in FIG. 6, the power voltage is impressed upon the variable resistor 18 and the plastic thermistor 19 between the signal wires 20 and 20'. The heaters 17 and 17' and the signal wires 20 and 20' for detecting the temperature are disposed in the blanket.

The operation and effect of the embodiment of the present invention shown in FIG. 6 are substantially the same as those of the first and second embodiment shown in FIGS. 1 and 3, except that a security means is provided. Where the temperature is raised too high due to a malfunction of the signal wires 20 and 20' or due to nonexistence of the signal wires, the insulating layer 27 disposed between the heaters 17 and 17' becomes molten and the heaters 17 and 17' are short circuited. When the heaters are short circuited, the resistance of the heater is reduced to half of the original and a current twice as large as the rated load current flows in the circuit. Accordingly, the fuse 13 in the circuit is blown and no electric current flows through the heater. Thus, the electric blankets and the like are operated in safety.

Now still another embodiment of the temperature control device in accordance with the present invention wherein the load 3 in the first embodiment shown in FIG. 1 is substituted by a single heater and the signal-generating means 7 is substituted by a thermistor interposed between a couple of signal wires will be described with reference to FIG. 7. The like members are indicated by the like numerals in FIG. 3.

Figure 7:
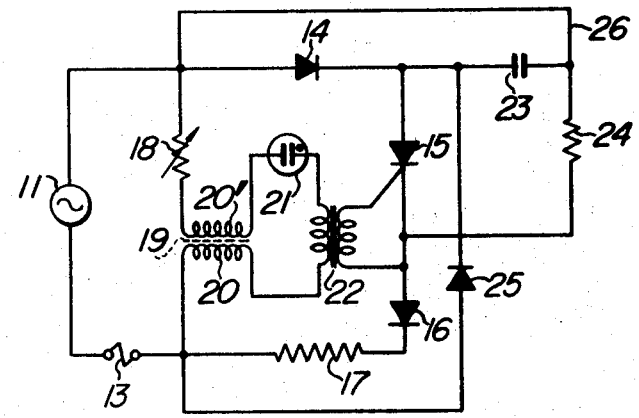

The main circuit in the embodiment shown in FIG. 7 consists of a diode 14, a thyristor 15, a diode 16, a heater 17, and a current fuse 13 connected in series across a source of alternating current supply.

In the control circuit of the embodiment described hereinabove, a variable resistor 18, one 20 of the couple of the signal wires 20 and 20', neon lamp 21, a primary winding of the transformer 22, and the other 201 of the couple of the signal wires 20 and 20' are connected in series across the source of alternating current supply, a secondary winding of the transformer 22 is connected between the gate and the cathode of the thyristor 15, a capacitor 23 and a resistor 24 connected in series are coupled between the anode and the cathode of the thyristor in parallel therewith, and a diode 25, the capacitor 23 and a lead wire 26 are connected in series across the source of alternating current supply.

NOw a further embodiment of the temperature control device in accordance with the present invention will be described referring to FIG. 8 wherein the load 3 employed in the first embodiment of the present invention is substituted for by a couple of heaters interposing an insulating layer which is molten above a prescribed temperature and a gate signal generating means 7 is substituted for by a thermistor interposed between a couple of signal wires. The numerals in FIG. 8 are just the same as those in FIG. 6 and, accordingly, the description thereof is omitted.

The operation and effect of the embodiment described just above are substantially the same as those in the embodiments shown in FIGS. 1, 3 and 6 except that the circuit in accordance with the former embodiment is provided with a fail-safe means.

First, in the case that the heater is overheated in the part of the electric blanket or the like where the signal wires 20 and 20' cannot detect the overheating and the heaters 17 and 17' are short circuited, a current twice as large or more as than the rated current flows through the current fuse 13 and the fuse 13 is blown regardless of the state of the thyristor 15. This is true also if diode 14 or 25 is short circuited by accident. That is, in the case that the diode 14 is short circuited, the half-wave current formed by the fuse 13, diode 25, short circuited diode 14, heater 17, switch 12 and power supply 11 flows through the heater 17, and a current twice as large as the rated current flows through the fuse 13 and the fuse 13 is blown. This is just the same in the case that the diode 25 is short circuited.

In the case that the diode 16 is short circuited by accident, the thyristor 15 is put into the blocked state as apparent from the description as to the embodiments shown in FIGS. 3 and 6. In the short circuit accident of the diode 14 or 16 as described above, there is no fear that too much current will flow into the power supply since the heater 17 is always connected in circuit.

In FIG. 9 a still further embodiment of the temperature control device in accordance with the present invention is described. The operation or behavior of the embodiment shown in FIG. 9 is the same as that of the embodiment shown in FIG. 3. The safety is greater in the embodiment in FIG. 9. That is, in the case that the diode 14 through which the load current flows is short circuited, a short circuit consisting of a fuse 13, a diode 25, a short circuited diode 14, a diode 28 and a power supply is formed and the fuse 13 is blown.

In FIG. 10, the rising temperature characteristics of the various embodiments shown in FIGS. 3, 6, 7, 8 and 9 are shown in comparison with the conventional phase control device. The characteristic curves A, B are those of the present invention, and the curves C, D and E are those of the conventional phase-control device.

As apparent from the diagram shown in FIG. 10, the rising temperature speeds are just equal to each other in the case of the prescribed temperatures A and B in the present invention, but in the conventional phase control the lower the prescribed temperature is set, the smaller is the rising speed of temperature as seen in the curves C and D. That is, the lower is the prescribed temperature is, the longer it takes to reach the prescribed temperature in the conventional phase-control device. Therefore, in the conventional control device, it has been required to set the prescribed temperature high at the beginning in order to make the rising speed fast and after a while to set the prescribed temperature down low to the desired temperature as shown in FIG. 10 by E so that the desired temperature may be obtained as quickly as possible. This additional operation has been very troublesome and inconvenient. In the present invention on the other hand, there is no need to carry out such an operation, and the desired temperature can be obtained with the highest efficiency by only one operation as shown in FIG. 10 by the curve B.

What is claimed is:

1. A heat-responsive temperature control device comprising
   a. a series circuit connected across the terminals of an AC power source, said series circuit including a heater-constituting resistance load, a plurality of diodes and a thyristor,
   b. gate signal generating means connected to the gate of said thyristor,
   c. a charge-and-discharge circuit including a capacitor having one end connected to the anode of said thyristor and a resistor having one end connected to the cathode of said thyristor,
   d. lead means connecting the juncture between the other ends of said capacitor and said resistor to one terminal of said power source,
   e. a reverse current blocking diode connected between the other terminal of said power source and the terminal of said capacitor to which the anode of the thyristor is connected, said blocking diode having a polarity opposite to that of said plurality of diodes, whereby said thyristor is triggered at its gate during the negative half cycle of said power source to be rendered and maintained in its conductive state until the subsequent positive half cycle by charge stored in said capacitor.

2. The device according to claim 1, in which said heater-constituting resistance load is composed of heating wires mounted in an insulating material which is fusible at a temperature above a predetermined value, and said gate signal generating means includes a series circuit composed of a variable resistor, a couple of conductors interposing a thermistor therebetween, a pulse generator and the primary winding of a pulse transformer, said series circuit being connected across the terminals of said power source, the secondary winding of said pulse transformer being connected between the gate and the cathode of said thyristor.

3. The device according to claim 1, in which said gate signal generating means includes a series circuit composed of a variable resistor, one of a couple of conductors interposing a thermistor therebetween, a pulse generator and the primary winding of a pulse transformer, said series circuit being connected across the terminals of an AC source, the secondary winding of said pulse transformer being connected between the gate and the cathode of said thyristor.

4. A device according to claim 3 wherein the series circuit comprising said gate signal generating means further includes the other of said couple of conductors having the thermistor interposed therebetween.

5. The device according to claim 4, in which said heating member is composed of a couple of heating wires mounted in an insulating material which is fusible at a temperature above a predetermined value, one of said couple of heating wires being connected in series with one of said plurality of diodes series-connected with said thyristor to said one terminal of the power source, and the other being connected in series with another of said plurality of diodes series-connected to said thyristor to the other terminal of said power source.

6. A heat-responsive temperature control device comprising
a. a thermistor layer interposed between a pair of conductors which serve as a heater and a signal wire respectively,
b. a first series circuit composed of one of said pair of conductors, first and second diodes, and a thyristor connected across an AC power source,
c. gate signal generating means including a second series circuit composed of a temperature-adjusting variable resistor, the other of said pair of conductors, a pulse generator and the primary winding of a pulse transformer connected across said power source, the secondary winding of said pulse transformer being connected between the gate and the cathode of said thyristor,
d. a third diode connected across the one of said paired conductors constituting the heater in opposite polarity with said first and second diodes,
e. a fourth diode connected in parallel with a series circuit composed of said thyristor and said second diode in opposite polarity therewith,
f. a charge-and-discharge circuit composed of a series-connected capacitor and a resistor connected between the anode and the cathode of said thyristor,
g. and lead means connecting the juncture between said capacitor and said resistor of the charge and discharge circuit to a terminal of said power source.

* * * * *

UNITED STATES PATENT OFFICE
CERTIFICATE OF CORRECTION

Patent No. 3,636,310    Dated January 18, 1972

Inventor(s) Tomoyuki HOSOKAWA et al

It is certified that error appears in the above-identified patent and that said Letters Patent are hereby corrected as shown below:

In the Claim for Convention Priority, one of the two Japanese applications claimed is missing and should be included as follows:

-- Japan, Patent Appln. N° 44/43435 filed May 27, 1969 --.

Signed and sealed this 4th day of July 1972.

(SEAL)
Attest:

EDWARD M. FLETCHER, JR.
Attesting Officer

ROBERT GOTTSCHALK
Commissioner of Patents